United States Patent
Baumann

(10) Patent No.: US 9,206,082 B2
(45) Date of Patent: Dec. 8, 2015

(54) HYDROPHOBIC CEMENTITIOUS COMPOSITION

(75) Inventor: Robert Baumann, Rueschlikon (CH)

(73) Assignee: Dow Global Technologies LLC, Midland, MI (US)

( * ) Notice: Subject to any disclaimer, the term of this patent is extended or adjusted under 35 U.S.C. 154(b) by 707 days.

(21) Appl. No.: 13/531,782

(22) Filed: Jun. 25, 2012

(65) Prior Publication Data

US 2013/0005864 A1 Jan. 3, 2013

Related U.S. Application Data

(60) Provisional application No. 61/502,553, filed on Jun. 29, 2011.

(51) Int. Cl.
| | |
|---|---|
| C04B 24/04 | (2006.01) |
| C08K 5/098 | (2006.01) |
| C04B 28/04 | (2006.01) |
| C04B 103/65 | (2006.01) |
| C04B 111/27 | (2006.01) |

(52) U.S. Cl.
CPC ............... C04B 24/04 (2013.01); C04B 28/04 (2013.01); C08K 5/098 (2013.01); *C04B 2103/65* (2013.01); *C04B 2111/27* (2013.01)

(58) Field of Classification Search
CPC C04B 24/04; C04B 24/2641; C04B 24/2623; C04B 24/2664; C08K 5/098
See application file for complete search history.

(56) References Cited

U.S. PATENT DOCUMENTS

| | | |
|---|---|---|
| 3,817,767 A | 6/1974 | Bozer et al. |
| 5,403,392 A | 4/1995 | Craig |
| 5,681,892 A | 10/1997 | Weidner et al. |
| 5,959,017 A | 9/1999 | Eck et al. |
| 6,127,483 A | 10/2000 | Weitzel et al. |
| 6,268,423 B1 | 7/2001 | Mayer et al. |
| 7,261,923 B2 | 8/2007 | Rhodes et al. |
| 7,288,149 B2 | 10/2007 | Rydgren et al. |
| 7,381,252 B2 | 6/2008 | Rhodes et al. |
| 7,407,535 B1 | 8/2008 | Humphrey et al. |
| 2003/0114583 A1 | 6/2003 | Stark et al. |
| 2006/0112863 A1* | 6/2006 | Orange et al. ............... 106/823 |
| 2006/0169183 A1 | 8/2006 | Waser |
| 2008/0038473 A1 | 2/2008 | Rhodes et al. |
| 2008/0196629 A1 | 8/2008 | Yamakawa et al. |
| 2008/0269390 A1 | 10/2008 | Weitzel |
| 2009/0054588 A1 | 2/2009 | Maier et al. |

FOREIGN PATENT DOCUMENTS

| | | |
|---|---|---|
| CN | 1675141 A | 9/2005 |
| CN | 101296878 A | 10/2008 |
| EP | 1048676 A2 | 11/2000 |
| JP | 2004131339 A | 4/2004 |
| JP | 04096044 B2 | 6/2008 |

\* cited by examiner

*Primary Examiner* — Peter D Mulcahy
(74) *Attorney, Agent, or Firm* — Andrew Merriam

(57) ABSTRACT

The invention relates to a cementitious composition that can effectively reduce the adsorption of water, which comprises a) at least one polymer that is the polymerization product of one or more ethylenically unsaturated monomers, in the form of their polymer dispersions and water-redispersible polymer powders; and b) at least one alkyl and/or alkenyl substituted dicarboxylic acids or anhydrides.

9 Claims, No Drawings

HYDROPHOBIC CEMENTITIOUS COMPOSITION

BACKGROUND

The invention relates to a new hydrophobic composition for cementitious mortars. Especially, it relates to a cementitious composition that can effectively reduce the adsorption of water.

Redispersible polymer powders have been employed for many years, in particular in the building sector, for modifying hydraulic systems such as cement-based adhesives and dry mixes in order to improve the strength properties. The advantages of using redispersible polymer powders instead of e.g. aqueous polymer dispersions are, inter alia, a high storage stability without addition of preservatives and the frost resistance of the pulverulent dry mixtures. Commercially available redispersible polymeric powders that have been used in e.g. cement-based tile adhesives and self-level flooring compounds include vinyl acetate/ethylene copolymers, various acrylic polymers, styrene/butadiene copolymers, and vinyl acetate/versatic acid vinyl ester copolymers.

Hydrophobic additives are usually used in cementitious mortars to reduce the adsorption of water of the resulting cementitious composition, among them, most commonly developed and used are organosilicon compounds, fatty acids and the fatty acid derivatives thereof, and hydrocarbon waxes. These additives either increase the water demand of the mortar, thus reducing the strength properties or they make the wetting of the mortar very difficult due to their high surface tension. For example, combinations of redispersible polymer powders with hydrophobic agents, like sodium oleate, are found to thicken the modified mortar and have a negative impact on workability.

U.S. Pat. No. 6,268,423 B1 teaches the use of organosilicon compounds as hydrophobicing agents in construction material. However, these materials do not have binding properties and do not contribute to the strength of the cured mortar.

US20030114583A1 also describes functionalized copolymers hydrophobicized with silicones, in the form of aqueous dispersions or water-redispersible powders.

The present inventors the present invention have surprisingly found that using dioic acids or anhydrides, i.e. alkenyl substituted succinic acids, in combination with redispersible polymer powders will improve significantly the hydrophobicity of the cured mortars. More surprisingly, it is found out that the combination of redispersible polymer powder with dioic acid esters does not impact the water-demand and the rheology of the fresh cementitious composition.

STATEMENT OF INVENTION

The present invention relates to a hydrophobic cementitious composition comprising a) at least one polymer made by polymerizing one or more ethylenically unsaturated monomers, in the form of their polymer dispersions and water-redispersible polymer powders; and b) at least one alkyl and/or alkenyl substituted dicarboxylic acids or anhydrides. The alkyl and/or alkenyl substituted dicarboxylic acids or anhydrides act as hydrophobicizing agents.

DETAILED DESCRIPTION OF THE INVENTION

In the present invention, the polymer is the polymerization product of ethylenically unsaturated monomers selected from the group consisting of vinyl esters of optionally branched $C_{1-18}$alkylcarboxylic acids, (meth)acrylic esters of optionally branched $C_{1-18}$ alcohols or $C_{2-18}$ diols, dienes, olefins, vinylaromatics, and vinyl halides.

Preferably, the vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched $C_{9-13}$ monocarboxylic acids.

Preferably, the polymer in the hydrophobic cementitious composition is further the polymerization product of from 0.1 to 50% by weight of auxiliary monomers, based on the total weight of the monomer mixture. More preferably, the auxiliary monomers are ethylenically unsaturated mono- and/or dicarboxylic acids.

In accordance with the present invention, the compositions include one or more alkyl substituted dicarboxylic acids have C3-C20 carbon atoms on the alkyl chain, and the alkenyl substituted succinic anhydrides have the following formula (I) or formula (II):

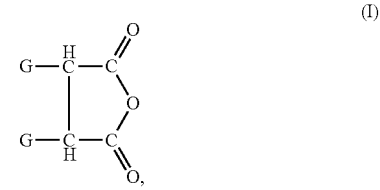

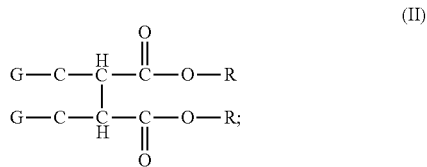

and at least one G of which represents alkenyl of from 3 to 20 carbon atoms, the other G independently represents hydrogen or alkenyl of from 3 to 20 carbon atoms and either R is, independently, hydrogen, ammonium or alkali metal.

Preferably, the alkenyl substituted dicarboxylic acids or anhydrides are salts of octenyl succinic acids. More preferably, the alkenyl substituted succinic acids and anhydrides are selected from the group consisting of sodium salt of dodecenyl succinic acid, potassium salt of dodecenyl succinic acid, and the combination thereof.

The hydrophobic cementitious composition of the present invention comprises at least one alkyl or alkenyl substituted dicarboxylic acids or anhydrides.

Alkyl substituted dicarboxylic acids with C3-C20, preferably from C8-C16, and most preferably from C10-C15 carbon atoms on the alkyl chain could be used in the present invention, examples include, but not limited to, elementary saturated dicarboxylic acids, elementary aromatic dicarboxylic acids, elementary unsaturated dicarboxylic acids, and the derivation thereof, for example, ethanedioic acid, propanedioic acid, butanedioic acid, pentanedioic acid, hexanedioic acid, heptanedioic acid, octanedioic acid, nonanedioic acid, decanedioic acid, undecanedioic acid, dodecanedioic acid, benzene-1,2-dicarboxylic acid, benzene-1,3-dicarboxylic acid, benzene-1,4-dicarboxylic acid, (Z)-butenedioic acid, (E)-butenedioic acid, pent-2-enedioic acid, dodec-2-enedioic acid, and (2E,4E)-hexa-2,4-dienedioic acid. Anhydrides, salts, and esters thereof can also be used in the present invention.

Alkenyl substituted succinic anhydrides with the following formula (I):

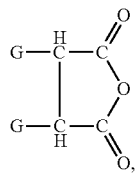

or alkenyl substituted succinic acid or salt with the following formula (II):

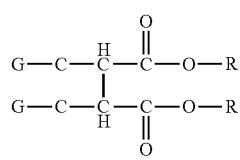

are preferably used in the present invention.

In either of formula (I) and formula (II), at least one G of which represents alkenyl of from 3 to 20, more preferably from 8 to 16, and most preferably from 10 to 15, both inclusive, carbon atoms, the other G independently represents hydrogen or alkenyl of from 3 to 20, more preferably from 8 to 16, most preferably from 10 to 15, both inclusive, carbon atoms and either R is independently hydrogen, ammonium or alkali metal. Thus, the half salts are herein included, as salts.

The alkenyl substituted succinic acids, salts, and anhydrides to be employed in the present invention are, in general, articles of commerce or are made by procedures substantially identical with those employed in manufacturing the articles of commerce, such as the reaction of an olefin with maleic anhydride, followed by, if desired, hydrolysis, or neutralization or both.

The position in the alkenyl chain of the ethylenic unsaturation that is characteristic of alkenyl moieties is not critical. Also, mixtures of alkyl and alkenyl substituted, and mixtures of anhydride, acid and salt, or any two of them, so long as adequate amounts of alkenyl succinic anhydride are supplied, work as well as pure materials.

Among the suitable compounds for use in the present invention are the following: a mixed hexadecenylsuccinic anhydride represented by the manufacturer as being an isomeric mixture; a relatively pure 1-decenylsuccinic anhydride having a refractive index n at 20° C. for the D line of sodium light of 1.4691; a mixed dodecenylsuccinic anhydride as a viscous liquid boiling at 180-182° C. under 5 millimeters mercury pressure absolute; a pure 1-dodecenylsuccinic anhydride as a crystalline solid melting at 38-40° C.; a 1-hexadecenylsuccinic anhydride melting at 59-60° C.; a tetradecenylsuccinic anhydride melting at 53-56.5° C.; and a 1,1,3,5-tetramethyl-2-octenylsuccinic anhydride, supplied as a viscous yellow liquid.

Preferably used alkenyl substituted succinic acid in the present invention is sodium salt of octenyl succinic acid. Most preferably, is sodium salt of dodecenyl succinic acid, or potassium salt of dodecenyl succinic acid, alone or in combination.

Other substances equally adapted to be used include octenyl succinic anhydride and didodecenylsuccinic anhydride.

Any of the foregoing can, if desired, be hydrolyzed to obtain the corresponding acid, and, if desired, neutralized with ammonia or an alkali metal hydroxide or the like to obtain a corresponding salt and the resulting product used successfully in the present invention. The sodium salt is preferred as least expensive, but the lithium and potassium salts can also be used. Representative such succinic acid compounds include 1-hexadecenylsuccinic acid, melting at 69-71° C. and the other homologues within the indicated scope.

The cementitious composition of the present invention further comprises at least one polymer that comprises the polymerization product of one or more ethylenically unsaturated monomers, in the form of their aqueous polymer dispersions or as water-redispersible polymer powders.

The proportion of the polymer in the form of aqueous polymer dispersions and water-redispersible polymer powders, is not critical. Preferably, it is in the range of 0.5-30 wt. %, more preferred 2-5 wt. %, most preferably 1-4 wt. % based on the dry-mixed powder composition of the present invention.

Suitable ethylenically unsaturated monomers for making the polymer include vinyl esters of unbranched or branched ("optionally branched") alkylcarboxylic acids having from 1 to 18 carbon atoms, acrylic or methacrylic esters of branched or unbranched alcohols or diols having from 1 to 18 carbon atoms, dienes, olefins, vinylaromatics, and vinyl halides, individually or as mixtures.

Suitable vinyl esters include those of carboxylic acids having from 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of .alpha.-branched monocarboxylic acids having from 9 to 13 carbon atoms, e.g. VeoVa™9, VeoVa™10, or VeoVa™11, trademarks of Resolution Performance Products LLC, Houston, Tex. Vinyl acetate is particularly preferred.

Suitable acrylic or methacrylic ester monomers include esters of unbranched or branched alcohols having from 1 to 18 carbon atoms. Preferred (meth)acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Particular preference is given to methyl acrylate, methyl methacrylate, n-butyl acrylate, tert-butyl acrylate, and 2-ethylhexyl acrylate.

Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

Where appropriate, it is also possible to copolymerize from 0.1 to 50% by weight of auxiliary monomers, based on the total weight of the monomer mixture. It is preferable to use from 0.5 to 15% by weight of auxiliary monomers. Examples of auxiliary monomers are ethylenically unsaturated mono- and dicarboxylic acids, preferably acrylic acid, methacrylic acid, fumaric acid, or maleic acid; ethylenically unsaturated carboxamides and ethylenically unsaturated carbonitriles, preferably acrylamide or acrylonitrile; mono- and diesters of fumaric or maleic acid, e.g. the diethyl and diisopropyl esters; maleic anhydride; and ethylenically unsaturated sulfonic acids and salts of these, preferably vinylsulfonic acid and 2-acrylamido-2-methyl propanesulfonic acid. Other examples are pre-crosslinking monomers, such as polyethylenically unsaturated comonomers, e.g. divinyl adipate, diallyl maleate, diallyl phthalate, allyl methacrylate or triallyl cyanurate, or post-crosslinking comonomers, e.g. acrylamidoglycolic acid (AGA), methyl methylacrylamidoglycolate (MAGME), N-methylolacrylamide (NMA), N-methylolmethacrylamide, allyl N-methylolcarbamate, alkyl ethers or esters such as the isobutoxy ether of N-methylolacrylamide, of N-methylolmethacrylamide, or of allyl N-methylolcarbamate. Epoxy-functional comonomers such as glycidyl methacrylate and glycidyl acrylate, are also suitable. Other examples are silicon-functional comonomers, such as acryloxypropyltri(alkoxy)- and methacryloxypropyltri(alkoxy) silanes, vinyltrialkoxysilanes, and vinylmethyldialkoxysilanes, examples of alkoxy groups which may be present being ethoxy and ethoxypropylene glycol ether radicals. Mention may also be made of monomers having hydroxy or CO groups, e.g. hydroxyalkyl esters of methacrylic or acrylic acid, for example hydroxyethyl, hydroxypropyl, or hydroxybutyl acrylate, and hydroxyethyl, hydroxypropyl, or hydroxybutyl methacrylate, and also of compounds such as diacetoneacrylamide, acetylacetoxyethyl acrylate, and acetylacetoxyethyl methacrylate.

Particular preference is given to polymers of one or more of vinyl acetate, vinyl esters of .alpha.-branched monocarboxylic acids having from 9 to 13 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene.

Greatest preference is given to:
polymers of vinyl acetate, if desired, also with ethylene;
polymers of vinyl acetate, ethylene, and a vinyl ester of .alpha.-branched monocarboxylic acids having from 9 to 13 carbon atoms;
polymers of n-butyl acrylate with 2-ethylhexyl acrylate and/or methyl methacrylate;
polymers of styrene with one or more monomers from the group consisting of methyl acrylate, ethyl acrylate, propyl acrylate, n-butyl acrylate, 2-ethylhexyl acrylate, and 1,3-butadiene; and
polymers of vinyl acetate with one or more monomers from the group consisting of methyl acrylate, ethyl acrylate, propyl acrylate, n-butyl acrylate, and 2-ethylhexyl acrylate, and, where appropriate, ethylene;
where the polymers mentioned may also contain one or more of the abovementioned auxiliary monomer units.

The selection of monomers and the selection of the proportions by weight of any comonomers may be such as to give a glass transition temperature Tg of from −50° C. to 120° C., preferably from −30° C. to 95° C. The glass transition temperature Tg of the polymers can be determined in a known manner by differential scanning calorimetry (DSC) at a heating rate of 10° C./min. Tg may also be calculated by means of the Fox equation. According to T. G. Fox., BULL. AM. PHYSICS SOC. 1, 3, page 123 (1956): $1/Tg = x_1/Tg_1 + x_2/Tg_2 + \ldots + x_n/Tg_n$ where xn is the fraction by weight (% by weight/100) of the monomer n, and Tg.sub.n is the glass transition temperature in Kelvin of the homopolymer of the monomer n. Tg values for homopolymers are listed in POLYMER HANDBOOK 2nd Edition, J. Wiley & Sons, New York (1975).

The polymers are prepared in a manner known per se by the emulsion polymerization processor by the suspension polymerization process, in the presence of protective colloids and/or of emulsifiers. Preference is given to the emulsion polymerization process, the polymerization temperature generally being from 40° C. to 100° C., preferably from 60° C. to 90° C. When gaseous comonomers are copolymerized, e.g. ethylene, 1,3-butadiene or vinyl chloride, operation may also be carried out at super atmospheric pressure, generally at from 5 to 100 bar.

The polymerization is initiated using the water-soluble or monomer-soluble initiators commonly used for emulsion or suspension polymerization, or redox-initiator combinations. Examples of water-soluble initiators are the sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile.

Examples of monomer-soluble initiators are dicetyl peroxydicarbonate, dicyclohexyl peroxydicarbonate, and dibenzoyl peroxide. The amount of the initiators generally used, based on the total weight of the monomers, is from 0.01 to 0.5% by weight.

Redox initiators used are combinations of the above initiators with reducing agents. Suitable reducing agents are the sulfites and bisulfites of the alkali metals and of ammonium, e.g. sodium sulfite, the derivatives of sulfoxylic acid, e.g. the formaldehydesulfoxylate of zinc or of an alkali metal, e.g. sodium hydroxymethanesulfinate, and ascorbic acid. The amount of reducing agent is preferably from 0.01 to 0.5% by weight, based on the total weight of the monomers.

Regulating substances (chain transfer agents) may be used during the polymerization to control molecular weight. If regulators are used, the amounts usually used are from 0.01 to 5.0% by weight, based on the total weight of monomers to polymerized, either as a separate feed, or pre-mixed with reaction components. Examples of these substances include n-dodecyl mercaptan, tert-dodecyl mercaptan, mercaptopropionic acid, methyl mercaptopropionate, isopropanol, and acetaldehyde. It is preferable to use no regulating substances.

Up to 5 wt. %, preferably up to 3 wt. % of a surfactant is optionally used, based on the total weight of monomers to be polymerized. One or more surfactants, including anionic and nonionic surfactants, and mixtures thereof, are commonly used. Many examples of surfactants suitable for emulsion polymerization are given in McCutcheon's Detergents and Emulsifiers (M C Publishing Co. Glen Rock, NF), published annually. Other types of stabilizing agents, such as protective colloids, are optionally used. Suitable protective colloids are partially hydrolyzed polyvinyl alcohols; polyvinylpyrrolidones; polyvinyl acetals; polysaccharides in water-soluble form, e.g. starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, vinyl ether-maleic acid copolymers. Preference is given to partially hydrolyzed or completely hydrolyzed polyvinyl alcohols.

The total amount of the protective colloids generally used in the polymerization is from 1 to 20% by weight, based on the total weight of the monomers. It is possible for all of the protective colloid content to form an initial charge, or else to be divided between initial charge and feed.

It is preferable to operate without adding emulsifier. Where appropriate, it is possible to use from 0.1 to 5% by weight of emulsifiers, based on the amount of monomers. Suitable emulsifiers are either anionic, cationic, or else non-ionic emulsifiers, e.g. anionic surfactants, such as alkyl sulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or with alkylphenols, and nonionic surfactants, such as alkyl polyglycol ethers or alkylaryl polyglycol ethers having from 8 to 40 ethylene oxide units.

All of the monomers may be present in the initial charge, all may be supplied as a feed, or some of the monomers may be present in the initial charge, the remainder fed in after initiation of the polymerization. The procedure is preferably that from 50 to 100% by weight of the monomers, based on their total weight, form the initial charge, the remainder supplied as a feed. The feeds may be separate in space and time) or some or all of the components may be fed in pre-emulsified form. Once the polymerization has been concluded, post-polymerization may be carried out using known methods to remove residual monomers, for example using redox-catalyst-initiated post-polymerization. Volatile residual monomers may also be removed by means of distillation, preferably at subatmospheric pressure, optionally with passage of inert entrainer gases, such as air, nitrogen, or steam, through or over the product. The aqueous polymer dispersions preferably have a solid content from 30 to 75% by weight, more preferably from 50 to 60% by weight.

To prepare the polymer powders, the aqueous dispersions, optionally after addition of protective colloids as spraying aids, are dried, for example by means of fluidized-bed drying, freezedrying, or spray drying. The dispersions are preferably spray-dried. Spray drying takes place in conventional spray-drying systems, and atomization may be by means of single-, twin-, or multifluid nozzles, or may use a rotation disk, etc. The discharge temperature selected is generally in the range from 45° C. to 120° C., preferably from 60° C. to 90° C., depending on the system, the Tg of the resin, and the desired degree of drying.

In the case of the drying process to give water-redispersible polymer powders, use is generally made of a total amount of from 3 to 30% by weight of a spraying aid, based on the polymeric constituents of the dispersion. This means that the total amount of protective colloid prior to the drying procedure is to beat least from 3 to 30% by weight, based on polymer content; it is preferable to use from 5 to 20% by weight, based on polymer content.

Suitable spraying aids are partially hydrolyzed polyvinyl alcohols; polyvinylpyrrolidones; polysaccharides in water-soluble form, such as starches (amylose and amylopectin), celluloses and their carboxymethyl, methyl, hydroxyethyl, hydroxypropyl derivatives; proteins, such as caseine or caseinate, soya protein, gelatin; ligninsulfonates; synthetic polymers, such as poly(meth)acrylic acid, copolymers of (meth)acrylates having carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers, and vinyl ether-maleic acid copolymers. It is preferable to use no protective colloids other than polyvinyl alcohols as spraying aid.

A content of up to 1.5% by weight of antifoam agent, based on the base polymer solids, has frequently proven advantageous during spraying. The resultant powder may be provided with an antiblocking agent (anticaking agent), preferably in amounts of up to 30% by weight, based on the total weight of polymeric constituents, in order to increase storage stability by improving blocking resistance, in particular in the case of powders with low glass transition temperature. Examples of antiblocking agents are calcium carbonate, magnesium carbonate, talc, gypsum, silica, kaolins, and silicates with particle sizes preferably in the range from 10 nm to 10 μm.

The viscosity of the dispersion for spraying is preferably adjusted, by way of the solids content, to give a value of <500 mPas (Brookfield viscosity at 20 rpm and 23° C.), preferably <250 mPas. The solids content of the dispersion for spraying is >35%, preferably >40%.

Other additives may be added during spraying to improve performance characteristics. Examples of other constituents of dispersion powder compositions present in preferred embodiments are pigments, fillers, and foam stabilizers.

Examples of fillers which may be used are carbonates such as calcium carbonate in the form of dolomite, calcite, or chalk, silicates such as magnesium silicate in the form of talc, or aluminum silicates, such as loam and clays; powered quartz, quartz sand, finely divided silica, feldspar, barite, and calcium sulfate. Fibrous fillers are also suitable. Use is often made industrially of mixtures of various fillers, for example mixtures of fillers of different particle size, or mixtures of carbonaceous and silicaceous fillers.

Other additives may be used are thickeners, the amount generally used of these being from 0.01 to 2.0% by weight, based on the total dry weight of the formulation. Commonly used organic thickeners are cellulose ethers and starches. Bentonite is an example of an inorganic thickener. Other additives include preservatives, antifoams, antifreezes.

All components, as in the form of powder are added in a blender and are mixed until they are homogeneously distributed. Aqueous solution of alkenyl succinic acid salts need to be dried or sprayed onto a carrier substance before drying. The carrier substance could be clay or amorphous silica.

The hydrophobic cementitious composition of the present invention may be successfully used in many kinds of conventional and/or commercial cementitious base compositions like concrete or mortars to effectively reduce the adsorption of water. Portland cements are among those conventional and/or commercial cementitious base compositions, and can be used in any of the standard cement types I, II, III, IV, or V (which are sometimes designated by the corresponding Arabic numerals). Other examples of the cementitious base compositions include, but not limited to the aluminous cements, the pozzolan cements, the mortars, lime, plaster, Plaster-of-Paris, and its special forms containing wood flour and sometimes called "water putty"; slag cements and the expansive cements of high aluminosulfate content.

The following examples are provided for illustrative purposes only and are not intended to limit the scope of the claims that follow. Unless otherwise indicated, all parts and percentages are by weight.

EXAMPLES

Example 1

Water Pick-up and Adhesion Test for Different Alkenyl Substituted Succinic Anhydride Application tests have been done in a cementitious ETICS base coat formulation and have been tested after 12 days according to ETAG 004. Components of formulations 1-6 are shown in Table 1, below, containing different kinds of alkenyl substituted succinic acid salts. All succinic acid salts in table 1 were added as an aqueous solution (35% solids).

TABLE 1

Formulations with different alkenyl substituted succinic anhydrides

| Components (pbw as solids) | 1 | 2 | 3 | 4 | 5 | 6 |
|---|---|---|---|---|---|---|
| Holcim CEM I 42,5R (portland cement) | 28.00 | 28.00 | 28.00 | 28.00 | 28.00 | 28.00 |
| quartz sand | 61.08 | 61.08 | 61.08 | 61.08 | 61.28 | 61.28 |
| carbonate filler | 8.00 | 8.00 | 8.00 | 8.00 | 8.00 | 8.00 |
| Hydroxypropyl methyl cellulose | 0.12 | 0.12 | 0.12 | 0.12 | 0.12 | 0.12 |
| RDP* | 2.800 | 2.500 | 2.500 | 2.500 | 2.500 | 2.500 |
| Sodium salt of dodecenyl succinic acid | | 0.300 | | | | |
| Potassium salt of dodecenyl succinic acid | | | 0.300 | | | |
| Potassium salt of octenyl succinic acid | | | | 0.300 | | |
| Sodium oleate | | | | | 0.100 | |
| Slicone Hydrophobic Powder | | | | | | 0.100 |
| Total | 100.00 | 100.00 | 100.00 | 100.00 | 100.00 | 100.00 |
| Water/Solid Ratio | 0.180 | 0.180 | 0.180 | 0.180 | 0.180 | 0.180 |

*RDP polymerized from styrene(64%), butadiene(33%) itaconic acid (3%). The powder further contains a colloidal stabilizer (PVOH 88-4) and an anticaking agent (clay).

As shown in Table 2, above, the sodium and potassium salt of dodecenyl succinic acid provides lowest water pick up and best adhesion after 1 day of water ageing.

TABLE 2

| Results | 1 | 2 | 3 | 4 | 5 | 6 |
|---|---|---|---|---|---|---|
| Adhesion/Polystyrene | | | | | | |
| 12 d, RT (N/mm$^2$) | 0.09 | 0.08 | 0.08 | 0.11 | 0.09 | 0.10 |
| 12 d RT + 1 d H$_2$O (N/mm$^2$) | 0.04 | 0.06 | 0.06 | 0.05 | 0.04 | 0.05 |
| Water Uptake | | | | | | |
| after 24 h (kg/m$^2$) | 0.70 | 0.25 | 0.27 | 0.59 | 0.58 | 0.52 |

Example 2

Other Tests for Formulations with or without Alkenyl Substituted Succinic Anhydrides and/or RDP More tests were performed in ETICS applications according to ETAG 004, including measuring the open time of the mortar by evaluation of the wettability of the backside of a tile according to DIN 18156 part 2.

TABLE 3

Formulations with or without alkenyl substituted succinic anhydrides/RDP

| Components (pbw as solids) | 7 | 8 | 9 | 10 | 11 | 12 |
|---|---|---|---|---|---|---|
| Holcim CEM I 42,5R (portland cement) | 28.00 | 28.00 | 28.00 | 28.00 | 28.00 | 28.00 |
| Quarzsand | 61.28 | 61.08 | 63.58 | 61.28 | 61.28 | 63.78 |
| carbonate filler | 8.00 | 8.00 | 8.00 | 8.00 | 8.00 | 8.00 |
| Hydroxypropyl methyl cellulose | 0.12 | 0.12 | 0.12 | 0.12 | 0.12 | 0.12 |
| RDP | 2.60 | 2.50 | — | — | 2.50 | — |
| Sodium salt of dodecenyl succinic acid | — | 0.10 | 0.10 | 2.60 | — | — |
| Sodium oleate | — | — | — | — | 0.1 | 0.1 |
| Total | 100 | 100 | 100 | 100 | 100 | 100 |
| Water/Solid Ratio (W/S) | 0.18 | 0.18 | 0.18 | 0.26 | 0.18 | 0.18 |

As shown in Table 3, above, and result Table 4, below, Formulation 7 does not include any hydrophobing agents. As expected the water uptake after 24 hours is highest (0.783 kg/m$^2$). Combining the redispersible polymer powder with the sodium salt of dodecyl succinic acid (Formulation 8) gives a significant improvement in water repellency with no impact on the mortar rheology. The open time of the mortar after 10 minutes enables a wetting of 20% of the surface. The hydrophobicizing agent alone, without the RDP does not give sufficient bond strength to the polystyrene board (Formulation 9). In comparative Formulation 10 we have replaced the full amount of RDP by an equivalent amount of the hydrophobicizing agent. In order to achieve a rheology of the past similar to formulation 7 we had to add 26% of water. This formulation did not provide any bond strength and could not be properly applied as an ETICS mortar.

Comparing the performance attributes of the combination of RDP/succinic acid ester with the combination of RDP/sodium oleate, as shown in Table 4, below, comparative Formulation 11 has higher water absorbency than inventive Formulation 8, but better than Formulation 7. The mortar in Formulation 11 has a higher consistency, resulting in poor workability and reduced open time. One could add more water to the formulation to achieve similar rheology, but this is undesired as one would expect less bond strength due to the higher water/cement ratio. Sodium oleate alone (Formulation 12) does not provide the required bond strength.

TABLE 4

| Results | 7 | 8 | 9 | 10 | 11 | 12 |
| --- | --- | --- | --- | --- | --- | --- |
| Adhesion/Polystyrene | | | | | | |
| 12 d, RT (N/mm$^2$) | 0.11 | 0.10 | 0.03 | 0 | 0.11 | 0.04 |
| 12 d RT + 1 d H2O (N/mm$^2$) | 0.06 | 0.06 | 0.03 | 0 | 0.07 | 0.04 |
| water uptake | | | | | | |
| after 24 h (kg/m$^2$) | 0.783 | 0.325 | 0.294 | 0.442 | 0.486 | 0.413 |
| slump (mm) | 154 | 144 | 138 | 173 | 154 | 145 |
| Brookfield-Viscosity 5 rpm (Pa*s) | 441 | 428 | 660 | 527 | 580 | 618 |
| Wetting | | | | | | |
| after 5 min (%) | 65 | 45 | 70 | 0 | 35 | 75 |
| after 10 min (%) | 40 | 20 | 20 | 0 | 0 | 5 |
| after 15 min (%) | 0 | 10 | 10 | 0 | 0 | 0 |

I claim:

1. A hydrophobic cementitious composition comprising
   a) at least one polymer that is the polymerization product of on one or more ethylenically unsaturated monomers, in the form of a water redispersible polymer powder; and
   b) at least one alkyl and/or alkenyl substituted dicarboxylic acids or anhydrides.

2. The hydrophobic cementitious composition according to claim 1 wherein the ethylenically unsaturated monomers are selected from the group consisting of vinyl esters of optionally branched $C_{1-18}$ alkylcarboxylic acids, (meth) acrylic esters of optionally branched $C_{1-18}$ alcohols or $C_{2-18}$ diols, dienes, olefins, vinylaromatics, and vinyl halides.

3. The hydrophobic cementitious composition according to claim 2 wherein the vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched $C_{9-13}$ monocarboxylic acids.

4. The hydrophobic cementitious composition according to claim 1 wherein the polymer is further a copolymerization product of from 0.1 to 50% by weight of auxiliary monomers, based on the total weight of the monomer mixture used to make the polymer.

5. The hydrophobic cementitious composition according to claim 4 wherein the auxiliary monomers are ethylenically unsaturated mono- and/or dicarboxylic acids.

6. The hydrophobic cementitious composition according to claim 1 wherein the alkyl substituted dicarboxylic acids have from 3 to 20 carbon atoms on their alkyl chain.

7. The hydrophobic cementitious composition according to claim 1 wherein the compound b) is an alkenyl substituted dicarboxylic acid or anhydride which is a succinic acid or anhydride having the following formula (I) or formula (II):

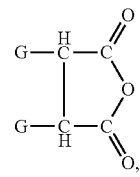
(I)

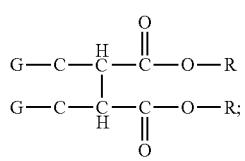
(II)

and wherein, in each formula, at least one G of which represents alkenyl of from 3 to 20 carbon atoms, and the other G independently represents hydrogen or alkenyl of from 3 to 20 carbon atoms and either R is independently hydrogen, ammonium or alkali metal.

8. The hydrophobic cementitious composition according to claim 7 wherein the alkenyl substituted dicarboxylic acids or anhydrides are salts of octenyl succinic acids.

9. The hydrophobic cementitious composition according to claim 8 wherein the alkenyl substituted succinic acids and anhydrides are selected from the group consisting of sodium salt of dodecenyl succinic acid, potassium salt of dodecenyl succinic acid, and the combination thereof.

* * * * *